Figure 1:
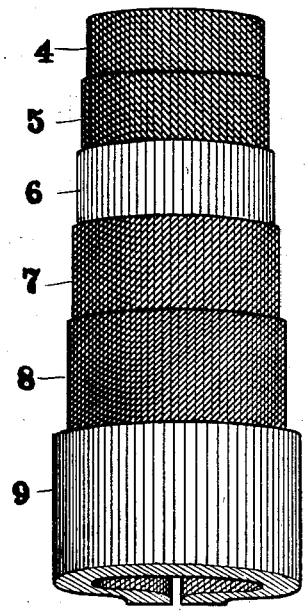

P. W. LITCHFIELD.
TIRE.
APPLICATION FILED MAY 9, 1908.

943,358.

Patented Dec. 14, 1909.

Witnesses:
Evelyn Blinn
Glenara Fox

INVENTOR—
Paul W. Litchfield,
BY C E Humphrey
ATTORNEY.

UNITED STATES PATENT OFFICE.

PAUL W. LITCHFIELD, OF AKRON, OHIO, ASSIGNOR TO THE GOODYEAR TIRE AND RUBBER COMPANY, OF AKRON, OHIO, A CORPORATION OF OHIO.

TIRE.

943,358.  Specification of Letters Patent.  Patented Dec. 14, 1909.

Application filed May 9, 1908. Serial No. 431,879.

*To all whom it may concern:*

Be it known that I, PAUL W. LITCHFIELD, a citizen of the United States, residing at Akron, in the county of Summit and State of Ohio, have invented new and useful Improvements in Tires, of which the following is a specification.

My invention relates to built-up pneumatic tires or tire-shoes which are primarily intended for electric vehicles, where, because of limited power, it is particularly important to decrease all waste of power and therefore all internal friction in the tire. Such tire-shoes for electric vehicles are built of so-called thread-fabric, which is composed of strong, longitudinal warp-threads held together either by fine, non-strength-giving, transverse weft threads, or even by the skim-coating of rubber which is commonly used as a cementing material to hold the several layers of the tire together. In either case, for convenience of phraseology, I shall designate the longitudinal, strength-giving threads as warp threads. Heretofore such tires have had the warp-threads of each layer of fabric at right angles to the warp-threads of each contiguous layer of fabric, whether above it or below it, this disposition having been adopted for the purpose of securing strength. Thus in a six-ply, thread-fabric, tire-shoe built according to the practice prevailing before my invention, the first, third and fifth layers of thread-fabric had their warp-threads parallel and at an angle of forty-five degrees to the plane of the tire; the second, fourth and sixth layers had their warp-threads parallel and also at an angle of forty-five degrees to the plane of the tire but at right angles to the warp threads first mentioned. I need hardly add that each layer of fabric is broad enough to extend from edge to edge of the tire. Now when a pneumatic tire is in operation, the indentation formed therein because of the weight of the vehicle, at the point of contact with the ground, travels circumferentially around the tire. The distortion thus created causes various stresses and strains to be set up in the plies of the tire-fabric tending to create friction, to generate heat, to waste energy which might otherwise be used in propulsion, to increase tire-wear and to decrease tire-resiliency.

I have discovered that the friction and consequent heating and loss of power and resiliency, due to the relative motion of two contiguous layers of fabric of a thread-fabric tire, is less when these contiguous layers have their warp-threads parallel than when they have their threads at right angles. This fact I have demonstrated by actual test. I have further discovered that when a thread-fabric tire runs over a stone, or the like, there is less danger of breaking the fabric when contiguous layers have their warp-threads parallel. To practically utilize this discovery, I build a tire containing in its structure, that is to say comprising, a set of two, three or more contiguous layers of thread-fabric, with their respective warp-threads parallel, but in actual practice, at an angle to the tire plane, and I superpose thereupon a set of two, three or more tire layers of thread-fabric with their respective warp-threads parallel but at an angle to the warp-threads of the first set. In this way I reduce, in a six-ply tire, the number of contacting and rubbing surfaces having their warp-threads at an angle from five to one. I may, further, to reduce the friction of this one contacting surface, there interpose an insulating layer of rubber which becomes vulcanized in the finished tire. I further find, in case of a sharp tire indentation caused by running over a stone, that the inner set of contiguous layers in my thread-fabric tire will act together to give strength to the fabric as will the outer layers, whereas if the direction of the warp be reversed for each layer, as in the prior practice, the inner layer, for instance, receives no real support from the threads of the contiguous layer but only from the alternate layer which is too far off to materially help, so that again as a matter of practical test, my tire wears considerably longer when subjected to repeated sharp indentations than the thread-fabric tires heretofore used. Finally, in case I build my tire of but two sets of layers, the individual layers of each set having their warp threads parallel, I make it possible to repair a hole or break in a thread-fabric tire and yet keep the tire of the thread-fabric type throughout. Heretofore a hole in a thread-fabric tire has had to be repaired by adding a patch of canvas or duck which is less resilient than thread-fabric. It will thus be seen that a thread-fabric pneumatic tire-shoe, constructed according to my invention, retains the full strength of thread-fabric tires in the ordinary operation along the road; that it has greater strength in resisting the wear caused by sharp indentation; that it can be repaired without destroying the thread-fabric character of the tire; and that the loss of power, heating and wear are diminished and resiliency is increased. Some of the power which, in prior thread tires, goes to heat up the tire-fabric and wear it out is utilized, in my thread-fabric tire, for propulsion.

Figure 2:
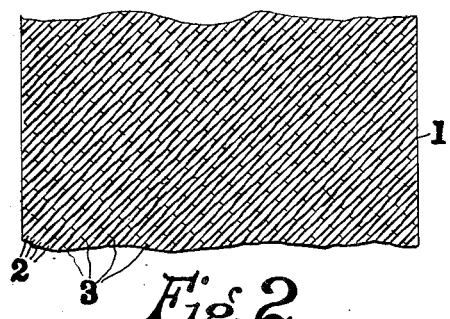
Figure 3:
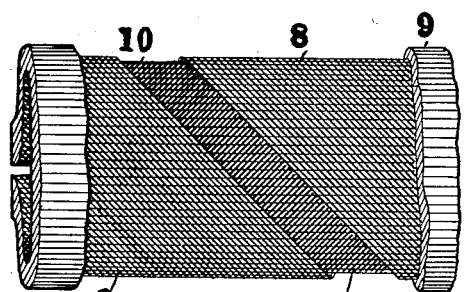
Figure 4:
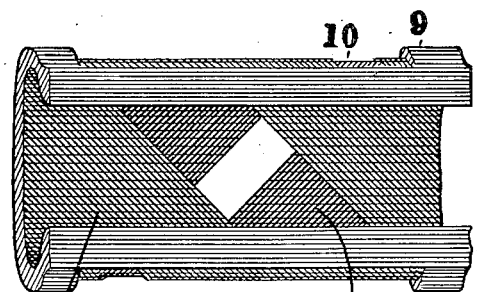

In the drawings,—Figure 1 is a plan view of a tire constructed in accordance with this invention with portions thereof broken away to better illustrate the construction thereof; Fig. 2 is a plan view showing the thread-fabric employed in constructing a tire in accordance with this invention; Fig. 3 is a plan of a tread portion of a tire with portions thereof broken away to illustrate the manner of repairing a tire; and, Fig. 4 is a view similar to Fig. 3, reversed.

The numerals 4 and 5 denote contiguous and superposed layers of thread-fabric each provided with the usual skim-coating of rubber or cement, for the purpose of making the layers adhere in the final vulcanization of the tire, and having their respective warp-threads practically or substantially parallel but at an angle to the plane of the core each layer being broad enough to extend from edge to edge of the tire. They constitute one set of layers of which my tire is composed. It will be clear that the best results will be obtained by having the warp-threads of the layer 4 parallel to the warp-threads of the layer 5 and in so far as parallelism is departed from, the advantageous features of my invention will be utilized to a less extent. The numerals 7 and 8 indicate another set of two superposed and contiguous layers of fabric having their respective warp-threads practically parallel but at right angles to those of the first set of layers each layer being broad enough to extend from edge to edge of the tire.

The numeral 6 indicates an insulating bushing of vulcanized rubber and the numeral 9 the outer rubber covering which constitutes the tread of the tire. The process of building such tire from its separate rubber-coated layers of fabric and tread upon a collapsible core and then vulcanizing it is precisely the same as that now in use and need not, therefore, be further described. I may merely add that Fig. 2 shows the now generally used form of thread-fabric having longitudinal, strong, heavy warp-threads connected by fine, non-strength-giving, transverse weft-threads, which, however, may be omitted, reliance being placed on the skim-coat of rubber. It will finally be observed that the longitudinal axial lines in Figs. 1, 3 and 4 are shade lines merely and do not indicate any set or sets of threads.

I prefer to construct my tire of two sets of layers as above described, for, in this way, I attain the further advantage of ease of repair. If a hole is torn in the tire-shoe, I may cut the weft-threads along the two bounding warp-threads of a strip or ribbon broad enough to completely encompass the hole in the outer set of layers. I then peel off this ribbon or strip from the tire. This is shown in Fig. 3. Similarly I peel a second ribbon of sufficient width from the second or inner set of layers, as shown in Fig. 4. I have thus removed all jags or injured portions of the tire. I now take two strips, each composed of superposed layers of thread-fabric of the length and width of those removed, and cement them in the place of those removed. I finally replace the injured portion of the thread by a fresh piece, subject the repaired portions of the tire to vulcanizing heat, in the usual fashion, and thereupon have practically a new tire.

I claim,—

1. A pneumatic tire comprising a set of superposed, contiguous layers of thread-fabric having the respective warp-threads approximately parallel, and another set of superposed, contiguous layers of thread-fabric having their respective warp-threads approximately parallel but at an angle to the warp-threads of the first set of layers, substantially as described.

2. A pneumatic tire comprising a set of contiguous, superposed layers of thread-fabric, having their respective warp-threads approximately parallel and at an angle to the plane of the tire, and another set of contiguous, superposed layers of thread-fabric having their respective warp-threads approximately parallel and at an angle to the warp-threads first mentioned, substantially as described.

3. A pneumatic tire composed of a set of contiguous, superposed layers of thread-fabric, having their respective warp-threads approximately parallel, a second set of contiguous, superposed layers of thread-fabric, having their respective warp-threads approximately parallel but at an angle to the warp-threads first mentioned, and a tread portion; whereby the tire may be repaired without destroying its thread-fabric character, substantially as described.

4. A pneumatic tire comprising a set of contiguous, superposed layers of thread-fabric, having their respective warp-threads approximately parallel, a set of contiguous, superposed layers of thread-fabric, having their respective warp-threads approximately parallel but at an angle to those first mentioned, and a friction-reducing layer between the sets, substantially as described.

In testimony whereof I have hereunto set my hand in presence of two subscribing witnesses.

PAUL W. LITCHFIELD.

Witnesses:
C. E. HUMPHREY,
GLENARA FOX.